United States Patent
Martínez González et al.

(10) Patent No.: US 11,158,325 B2
(45) Date of Patent: Oct. 26, 2021

(54) VOICE BIOMETRIC SYSTEM

(71) Applicant: Cirrus Logic International Semiconductor Ltd., Edinburgh (GB)

(72) Inventors: David Martínez González, Edinburgh (GB); Carlos Vaquero Avilés-Casco, Edinburgh (GB); Ana Mantecon, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 66 days.

(21) Appl. No.: 16/662,664

(22) Filed: Oct. 24, 2019

(65) Prior Publication Data
US 2021/0125618 A1 Apr. 29, 2021

(51) Int. Cl.
| | |
|---|---|
| *G10L 17/04* | (2013.01) |
| *G10L 15/07* | (2013.01) |
| *G10L 17/20* | (2013.01) |
| *G06F 21/32* | (2013.01) |
| *G10L 15/08* | (2006.01) |

(52) U.S. Cl.
CPC ............. *G10L 17/04* (2013.01); *G06F 21/32* (2013.01); *G10L 15/07* (2013.01); *G10L 15/083* (2013.01); *G10L 17/20* (2013.01)

(58) Field of Classification Search
CPC ...................................................... G10L 17/04
See application file for complete search history.

(56) References Cited

U.S. PATENT DOCUMENTS

| | | | | |
|---|---|---|---|---|
| 6,205,424 B1* | 3/2001 | Goldenthal | ............. | G10L 17/12 704/245 |
| 6,393,397 B1* | 5/2002 | Choi | ................... | G10L 17/04 704/238 |
| 6,401,063 B1* | 6/2002 | Hebert | .................. | G10L 17/04 704/234 |
| 6,519,565 B1* | 2/2003 | Clements | ............... | G10L 17/00 704/254 |
| 6,754,628 B1* | 6/2004 | Chaudhari | ............ | G10L 17/12 704/203 |
| 7,539,616 B2* | 5/2009 | Zhang | ................... | G10L 17/20 704/233 |
| 2006/0222210 A1* | 10/2006 | Sundaram | ........... | G06K 9/6255 382/115 |
| 2007/0198257 A1* | 8/2007 | Zhang | ................... | G10L 17/20 704/233 |

(Continued)

*Primary Examiner* — Douglas Godbold
(74) *Attorney, Agent, or Firm* — Jackson Walker L.L.P.

(57) ABSTRACT

A biometric system is tested to see whether a proposed use matches a configuration of the system. An enrolment input is received from an enrolling user, and compared with a system configuration model to obtain a configuration matching score value. The enrollment is then controlled based on a result of comparing the received enrollment input with the system configuration model. In the case of a voice biometric system, when a test input is received from a speaker, it is determined whether audio conditions applying to the test input correspond to system configuration conditions. Verification is performed by comparing the test input with a model of the speech of an enrolled user to generate a verification score for use in deciding whether to accept or reject the speaker, depending on whether it is determined that audio conditions applying to the test input correspond to the system configuration conditions.

13 Claims, 5 Drawing Sheets

(56) References Cited

U.S. PATENT DOCUMENTS

| | | | |
|---|---|---|---|
| 2007/0219801 A1* | 9/2007 | Sundaram | G10L 17/04 704/270 |
| 2014/0244257 A1* | 8/2014 | Colibro | G10L 17/12 704/246 |
| 2015/0301796 A1* | 10/2015 | Visser | G10L 15/22 715/728 |
| 2016/0365096 A1* | 12/2016 | Bocklet | G10L 17/02 |
| 2017/0236520 A1* | 8/2017 | Borgstrom | G10L 17/04 704/239 |
| 2018/0004925 A1* | 1/2018 | Petersen | G06F 21/32 |
| 2018/0130475 A1* | 5/2018 | Page | G06F 21/32 |

* cited by examiner

VOICE BIOMETRIC SYSTEM

BACKGROUND

This relates to a voice biometric system, and in particular to a method of improving the operation of such a system.

In a voice biometric system, a user provides at least one sample of their speech during an enrolment process, and this sample of speech is used to form a model of their speech.

Then, during a verification process, a received sample of speech is compared with the model. If the received sample of speech is sufficiently similar to the model, it is determined that the received sample of speech has come from the enrolled user. Based on this determination, the speaker may be given access to a voice controlled system, or the speaker may be given access to personal data of the enrolled user, for example.

In order to improve the results, the comparison between the received sample of speech and the model of the enrolled user's speech may also involve a comparison with a cohort of other speakers. Thus, a test for whether the received sample of speech has come from the enrolled user involves not simply a determination of some absolute level of similarity between the received sample of speech and the model, but also a determination as to whether the received sample of speech is closer to the model of the enrolled user's speech than it is to the models of the cohort of other speakers.

However, this additional comparison only works well if the cohort of other speakers are well matched to the enrolled user's speech and to the received sample of speech. For example, if a user with a particular accent enrols into the system, and that accent is different from the accents of the speakers in the cohort, the result will be that the speech of any other speaker with the same accent will be found to be more similar to the enrolled user than to the speakers of the cohort. This may result in a false determination that other speaker is the enrolled user.

Similarly, the verification process may involve comparing the received sample of speech with the model obtained during enrolment and with a Universal Background Model (UBM). If the received sample of speech is sufficiently similar to the model obtained during enrolment, in particular in aspects in which the model obtained during enrolment differs from the UBM, then this is a good indication that the received sample of speech has come from the enrolled user. By contrast, if the received sample of speech is similar to the model obtained during enrolment only in aspects in which the model obtained during enrolment is itself similar to the UBM, then this is not a good indication that the received sample of speech has come from the enrolled user.

SUMMARY OF THE INVENTION

According to a first aspect, there is provided a method of operation of a biometric system, the method comprising: receiving an enrolment input from an enrolling user; comparing the received enrolment input with a system configuration model to obtain a configuration matching score value; and controlling the enrolment based on a result of comparing the received enrolment input with the system configuration model.

The biometric system may be a voice biometric system.

Comparing the received enrolment input with a system configuration model may comprise comparing the received enrolment input with a cohort derived from a plurality of other people.

Comparing the received enrolment input with a system configuration model may comprise comparing the received enrolment input with a universal background model.

The method may comprise:
comparing the configuration matching score value with a first threshold value; and
enrolling the user and creating a model from the enrolment input if the configuration matching score value exceeds the first threshold value, or rejecting the enrolment if the configuration matching score value does not exceed the first threshold value.

The method may comprise:
comparing the configuration matching score value with a second threshold value; and
if the configuration matching score value exceeds the second threshold value, enrolling the user and creating a model from the enrolment input, and setting score normalization parameters based on the configuration matching score value, such that verification can be performed by comparing a test input with said model to generate a verification score, normalizing said score using said score normalization parameters, and accepting or rejecting the test input based on the normalized score.

The method may comprise:
comparing the configuration matching score value with a second threshold value; and
if the configuration matching score value exceeds the second threshold value, enrolling the user and creating a model from the enrolment input, and setting at least one threshold modification parameter based on the configuration matching score value, such that verification can be performed by comparing a test input with said model to generate a verification score, modifying a third threshold value using said at least one threshold modification parameter, and accepting or rejecting the test input based on a comparison between the verification score and the modified third threshold value.

The method may comprise:
comparing the configuration matching score value with a second threshold value; and
if the configuration matching score value exceeds the second threshold value, enrolling the user and creating a model from the enrolment input, and setting verification parameters such that a first normalization method is used during verification; and
if the configuration matching score value does not exceed the second threshold value, enrolling the user and creating a model from the enrolment input, and setting verification parameters such that a second normalization method is used during verification.

The first normalization method may be selected from a group comprising: P-Normalization, T-Normalization; Z-Normalization, ZT-Normalization, S-Normalization, and AS-Normalization.

The second normalization method may comprise a score subtraction method. According to a further aspect, there is provided a biometric system, comprising: an input, for receiving an enrolment input; and a processor, wherein the processor is configured for performing a method according to the previous aspect.

According to a further aspect, there is provided a device comprising such a biometric system. The device may comprise a mobile computing device, a games console, a remote control device, a home automation controller or a domestic appliance, a toy, a machine, an audio player, a video player, or a mobile telephone.

According to a further aspect, there is provided a tangible computer-readable medium, comprising code, for causing a processor to perform a method comprising:

receiving an enrolment input from an enrolling user;
comparing the received enrolment input with a system configuration model to obtain a configuration matching score value; and
controlling the enrolment based on a result of comparing the received enrolment input with the system configuration model.

According to a second aspect, there is provided a method of operation of a voice biometric system, the method comprising: receiving a test input from a speaker; determining whether audio conditions applying to the test input correspond to system configuration conditions; and performing verification by comparing the test input with a model of the speech of an enrolled user to generate a verification score for use in deciding whether to accept or reject the speaker, depending on whether it is determined that audio conditions applying to the test input correspond to the system configuration conditions.

The step of determining whether audio conditions applying to the test input correspond to system configuration conditions may comprise: forming a first vector representing Gaussians visited by an input generated during enrolment on a cohort of other speakers, forming a second vector representing Gaussians visited by the input generated during enrolment of each cohort member on models of other cohort members, averaged across a plurality of cohort members, forming a third vector representing Gaussians visited by the input audio on the cohort, and comparing said first, second, and third vectors.

According to a further aspect, there is provided a voice biometric system, comprising:

an input, for receiving an input representing speech;
and a processor, wherein the processor is configured for performing a method comprising:
receiving a test input from a speaker;
determining whether audio conditions applying to the test input correspond to system configuration conditions; and
performing verification by comparing the test input with a model of the speech of an enrolled user to generate a verification score for use in deciding whether to accept or reject the speaker, depending on whether it is determined that audio conditions applying to the test input correspond to the system configuration conditions.

According to a further aspect, there is provided a device comprising such a voice biometric system. The device may comprise a mobile computing device, a games console, a remote control device, a home automation controller or a domestic appliance, a toy, a machine, an audio player, a video player, or a mobile telephone.

According to a further aspect, there is provided a tangible computer-readable medium, comprising code, for causing a processor to perform a method comprising:

receiving a test input from a speaker;
determining whether audio conditions applying to the test input correspond to system configuration conditions; and
performing verification by comparing the test input with a model of the speech of an enrolled user to generate a verification score for use in deciding whether to accept or reject the speaker, depending on whether it is determined that audio conditions applying to the test input correspond to the system configuration conditions.

BRIEF DESCRIPTION OF DRAWINGS

For a better understanding of the present invention, and to show how it may be put into effect, reference will now be made to the accompanying drawings, in which.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The methods described herein can be implemented in a wide range of devices and systems, for example a mobile telephone, an audio player, a video player, a mobile computing platform, a games device, a remote controller device, a toy, a machine, or a home automation controller or a domestic appliance. However, for ease of explanation of one embodiment, an illustrative example will be described, in which the implementation occurs in a smartphone.

Figure 1:
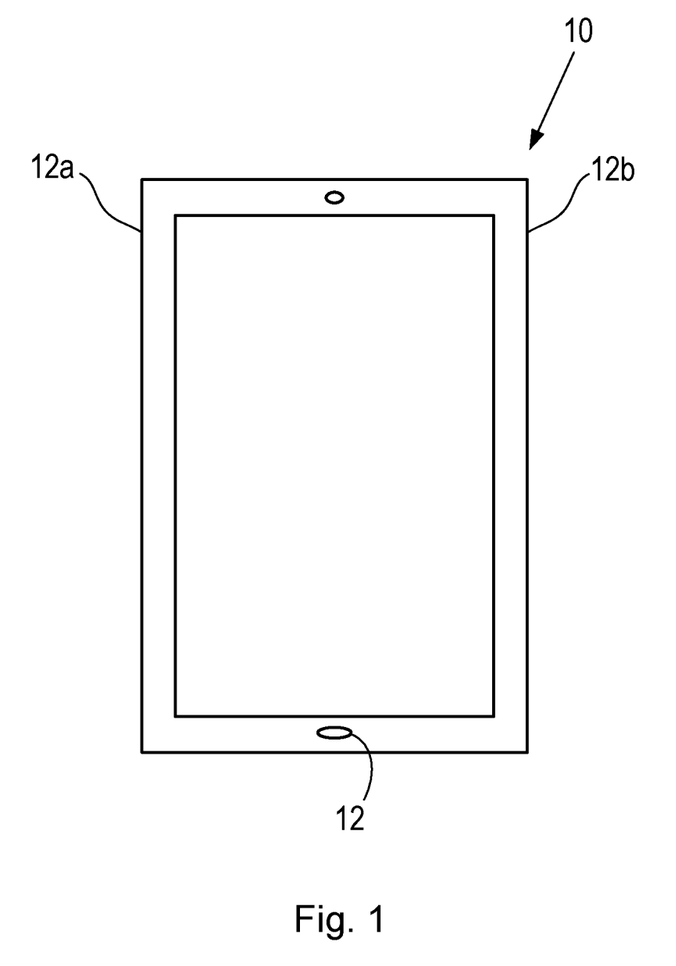
FIG. 1 illustrates a smartphone.

FIG. 1 illustrates a smartphone 10, having a microphone 12 for detecting ambient sounds. In normal use, the microphone is of course used for detecting the speech of a user who is holding the smartphone 10 close to their face. In addition, FIG. 1 shows the smartphone 10 having two optional additional microphones 12a, 12b.

Figure 2:
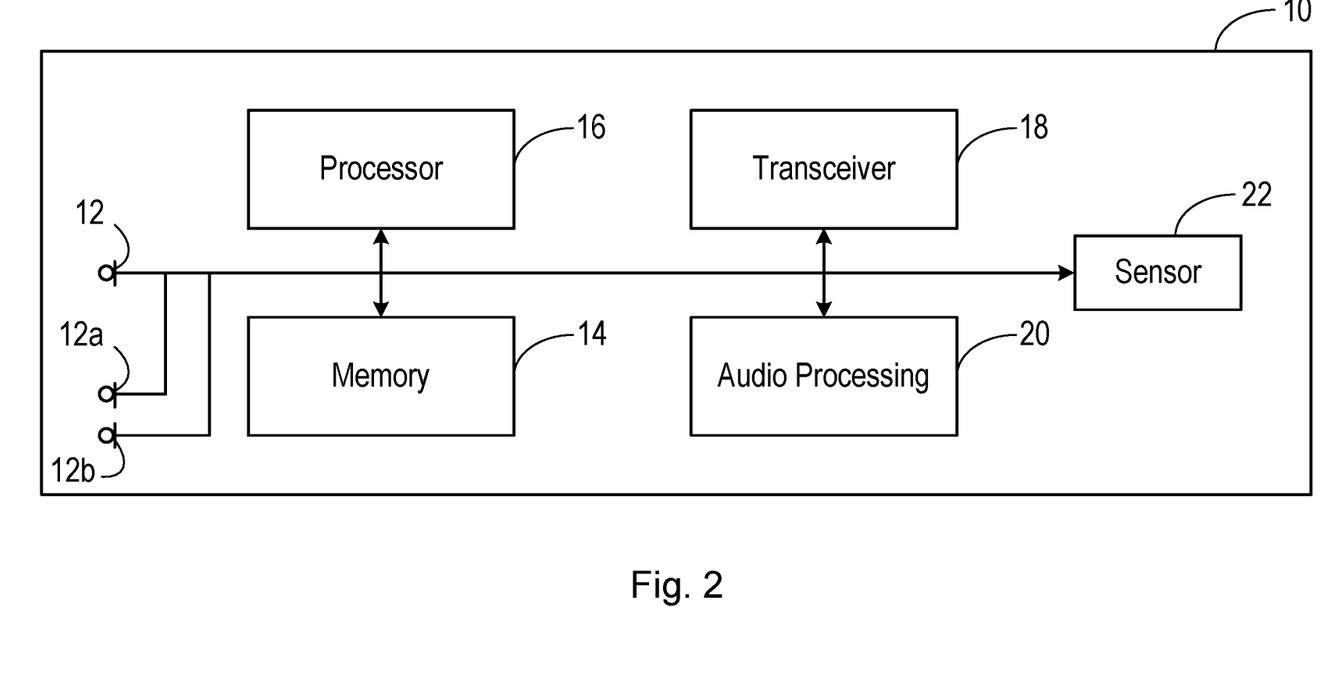
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote servers in a cloud computing environment. Signals based on the meaning of the spoken commands are then returned to the smartphone 10 or other local device.

Figure 3:
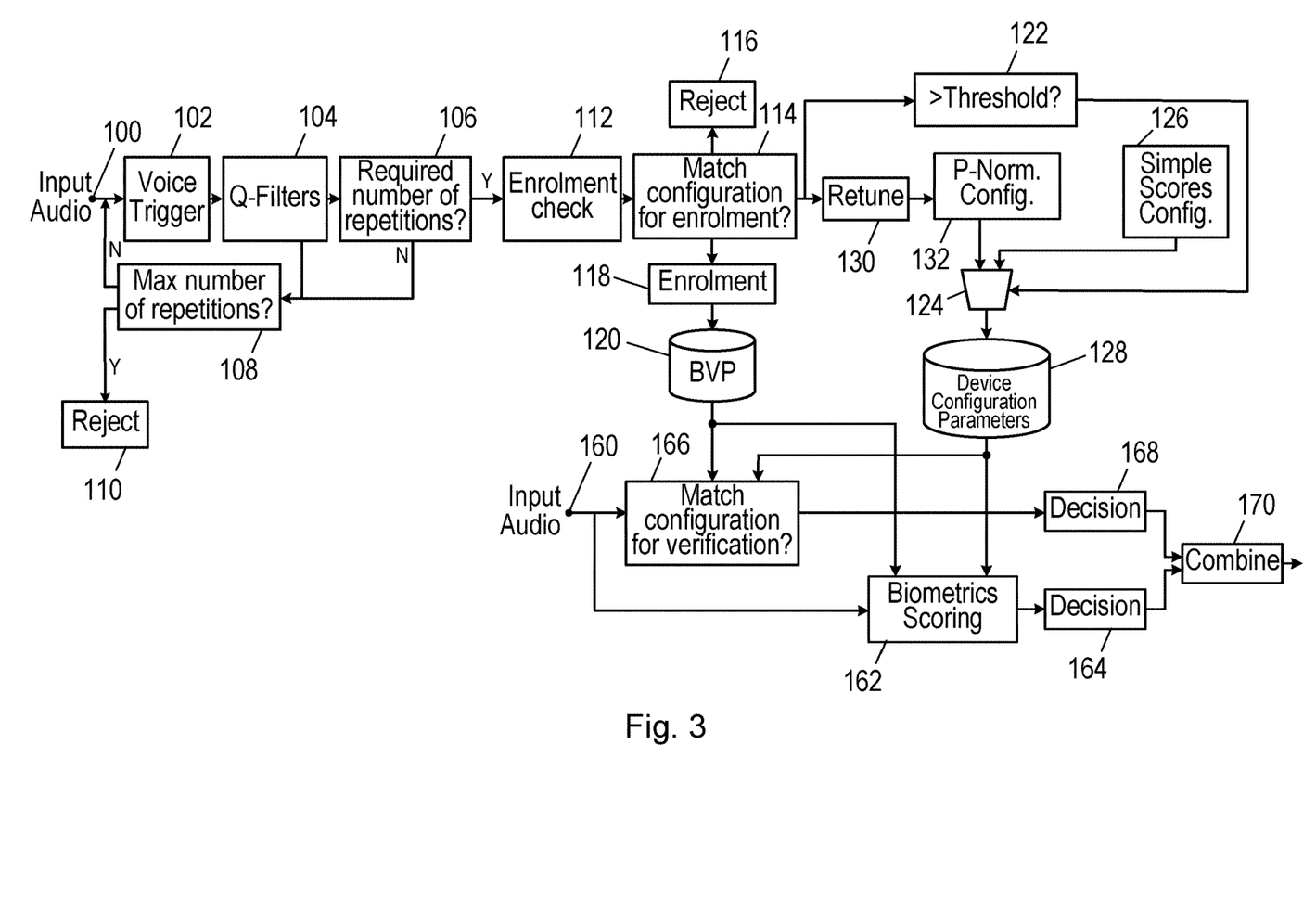
FIG. 3 is a schematic representation of a voice biometric system in accordance with the present disclosure.

FIG. 3 is a schematic representation of a voice biometric system in accordance with the present disclosure. The methods described herein are applicable to other biometric systems, but are described herein with reference to a voice biometric system for convenience. When another type of biometric system is used, such as a facial recognition system, the inputs to the system are not speech inputs, but take the required form.

During an enrolment phase, an input audio signal received from one or more of the microphones 12, 12a, 12b is received at an input 100, for example in response to a prompt from the system to an enrolling user, requiring the enrolling user to speak a specific phrase a predetermined number of times.

The input audio signal is passed to a voice trigger detection block 102, which determines whether the signal contains the specific trigger phrase. If so, that section of the speech signal is analysed by one or more quality filters 104, which determine whether the signal meets one or more predetermined quality criteria. For example, a signal may be used for the purposes of enrolment only if the signal-to-noise ratio of the signal exceeds a threshold. Similarly, a signal may be used for the purposes of enrolment only if it contains more than a minimum amount of net speech. Similarly, a signal may be rejected if the energy of the signal is too large to be handled within the allowed dynamic range of the input. If the quality criteria are not satisfied, the signal is rejected.

If the quality criteria are satisfied, the signal is passed to a count block 106, which determines whether the required number of repetitions of the trigger phase has been received.

If the quality criteria set by block 104 are not satisfied, or if the required number of satisfactory repetitions of the trigger phase set by block 106 has not been received, the process passes to block 108, which determines whether the user has repeated the phrase more than a maximum number of times. If so, that is, if the user has repeated the phrase more than the maximum number of times without providing the required number of satisfactory versions, the enrolment attempt is rejected in block 110. If the block 108 determines that the maximum number of times has not been reached, the system awaits a further repetition of the trigger phrase by the enrolling user.

If the user has provided the required number of satisfactory versions of the trigger phrase for enrolment, the signals representing these are passed to block 112, which performs an enrolment check. This may be as described in WO2019/097215, where a received voice sample is used to produce a voice print for enrolment only if it meets certain criteria, which are intended to determine whether there is a low probability that a sample of the user's speech will be falsely rejected when compared with the voice print, and whether there is a low probability that a sample of another speaker's speech will be falsely accepted when compared with the voice print.

The speech samples used for the enrolment are then passed to block 114, which determines whether these speech samples match the configuration of the voice biometric system. Specifically, in one embodiment, it is determined whether the speech of the enrolling user is sufficiently similar to the cohort speakers to allow the system to make accurate judgements as to whether speech samples that are received during the late verification phase have come from the enrolling user. In another embodiment, it is determined whether the speech of the enrolling user is sufficiently similar to a Universal Background Model that is used during the verification phase.

The determination as to whether the speech samples match the configuration of the voice biometric system is performed by considering each speech sample separately, in turn. Thus, for example, the required number of repetitions of the trigger phase may be set to any desired number, such as 5. For each input repetition i, a biometric voice print is formed from the other repetitions, and the one input repetition is evaluated against the BVP of the same user built with the remaining repetitions. A respective score s(i) is obtained. The one input repetition is then evaluated against all cohort members to give respective cohort scores, and the mean $\mu ML$ and standard deviation $\sigma ML$ of all of the cohort scores are calculated.

Then T-Normalization is applied on the score obtained from the evaluation against the BVP built from the other repetitions to give a normalized score snorm(i), where $$snorm(i)=[s(i)-\mu ML]/\sigma ML.$$

This gives a normalized score for that one repetition. Finally, the average of the normalized scores for the desired number of enrolment repetitions is calculated, to arrive at a configuration matching score value.

Block 114 can provide three possible outputs. If the speech samples intended to be used for the enrolment do not match the configuration of the voice biometric system, that is, if a configuration matching score calculated by the block 114 is below a first, lower threshold, the enrolment attempt is rejected, as shown in block 116. This would suggest that the speech of the enrolling user is very different from what was assumed during the configuration (for example the enrolling user may be a non-native speaker of the language that was assumed during the configuration, with a strong accent).

If the configuration matching score calculated by the block 114 is above the first, lower threshold, the enrolment attempt is accepted, as shown in block 118. In that case, a biometric voice print (BVP) 120 is calculated from the speech samples received during the enrolment.

In addition it is determined by block 122 whether the configuration matching score calculated by the block 114 is above or below a second, upper threshold.

If the configuration matching score calculated by the block 114 is below the second, upper threshold, a signal is sent to a multiplexer 124 to control it such that a simple scores configuration from a block 126 is applied to a device configuration parameters store 128. The simple scores configuration means that a score subtraction method is used during the verification phase. That is, when a speech sample is received during the verification phase, it is compared with a stored biometric voice print (BVP) to form a BVP score $LLK_{BVP}$, and it is also compared with a Universal Background Model to form a UBM score $LLK_{UBM}$, and the UBM score is subtracted from the BVP score to give a final normalised score snorm:

$$snorm = LLK_{BVP} - LLK_{UBM}.$$

However, if the configuration matching score calculated by the block 114 is above the second, upper threshold, the configuration matching score value is passed to a retune block 130, where one or more parameter values is retuned, and the retuned parameters are passed to a P-normalization configuration block 132. In addition, a signal is sent to a multiplexer 124 to control it such that the P-normalization configuration from the block 132 is applied to the device configuration parameters store 128.

The effect of retuning or modifying the parameters is that the scores generated by the eventual biometric scoring during verification will be altered, and this may have an effect when the biometric score is compared with the predetermined threshold value. Equivalently, the parameters may be left unchanged, so that the scores generated by the eventual biometric scoring are not altered, but the threshold value may be retuned to produce the same effect when the biometric score is compared with the modified threshold value.

P-normalization is one technique whereby, during a verification phase, the results obtained from comparing a received voice sample with a cohort can be used when assessing the result of comparing a received voice sample with a BVP of an enrolled user. The P-normalization technique is disclosed in U.S. patent application Ser. No. 15/992,562 and International Patent Application PCT/GB2019/051449.

Specifically, the process of P-normalization during verification of a biometric sample, for example a received voice sample, involves generating a score by comparing the received voice sample with a BVP of an enrolled user, and then generating a normalized score. It is the normalized score that is then compared with a threshold value, in order to form the basis for a decision as to whether to accept that the received voice sample has come from the enrolled user.

Specifically:

$$Scr_{norm} = (Scr - \mu_{norm})/(\max(\sigma_{norm}, \sigma_{clamp}))$$

where:
$Scr_{norm}$ is the normalized score,
Scr is the raw score obtained by comparing the received voice sample with the BVP;

$$\mu_{norm} = \mu_{pseudo} * \mu_{ML} + (1 - \mu_{pseudo}) * \mu_{prior}, \text{ and}$$

$$\sigma_{norm} = \sigma_{pseudo} * \sigma_{ML} + (1 - \sigma_{pseudo}) * \sigma_{prior}$$

and where:
$\mu_{ML}$ is the mean of the respective values obtained by comparing the received voice sample with each of the cohort samples,
$\sigma_{ML}$ is the standard deviation of the values obtained by comparing the received voice sample with each of the cohort samples,
$\mu_{prior}$ is the prior estimate of the mean value in a matched system,
$\sigma_{prior}$ is the prior estimate of the standard deviation in a matched system,
$\mu_{pseudo}$ and $\sigma_{pseudo}$ determine the respective weights given to the maximum likelihood solution $\mu_{ML}$ and $\sigma_{ML}$ and to the prior estimates $\mu_{prior}$ and $\sigma_{prior}$.

In addition:
$\sigma_{clamp}$ limits the minimum value for a in the normalization.

Thus, the process of P-normalization is intended to improve the step of comparing the received voice sample with the BVP, by also taking account of the results obtained by comparing the received voice sample with the cohort samples.

However, if the BVP is not well matched with the cohort samples, or other aspect of the system configuration, the process of P-normalization can produce scores that are higher than expected.

Therefore, in this embodiment, the process of P-normalization is adapted, based on how well the voice sample received during enrolment matches the cohort samples, or other aspect of the system configuration.

Figure 4:
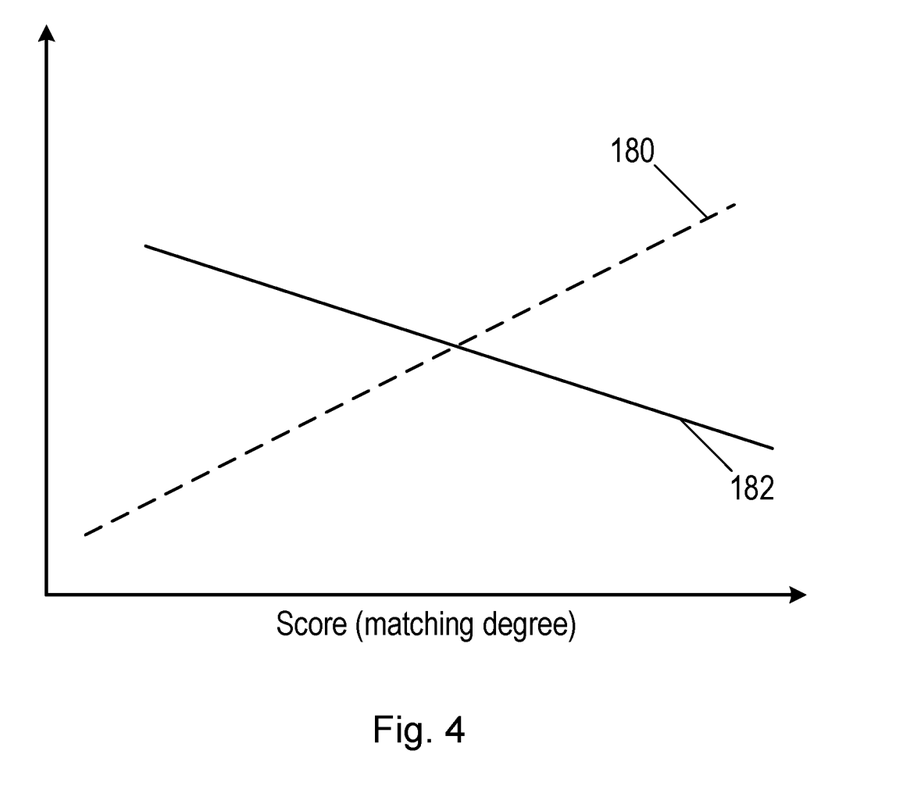
FIG. 4 illustrates adaptation of score normalization parameters.

FIG. 4 is a schematic illustration of this adaptation of the process of P-normalization.

Specifically, any or all of the parameters $\sigma_{clamp}$, $\mu_{pseudo}$, and $\sigma_{pseudo}$ can be adapted in the block 130 of FIG. 3 in accordance with the equation:

$$y = \alpha \cdot x + \beta,$$

where y is the adapted value of the relevant parameter, x is the score value calculated by the block 114, and values for $\alpha$ and $\beta$ are found in a training phase. Separate values for $\alpha$ and $\beta$ may be found for each of the parameters $\sigma_{clamp}$, $\mu_{pseudo}$, and/or $\sigma_{pseudo}$ that are to be adapted, leading to separate respective values for the parameters.

Typically, as shown generally by the line 180 in FIG. 4, positive values are chosen for a when determining how to adapt the values of $\mu_{pseudo}$ and $\sigma_{pseudo}$, such that, when the matching score is higher, a greater weight can be given to the maximum likelihood estimate, with a correspondingly lower weight given to the prior estimates of p and a.

Conversely, by way of illustration, one negative effect of conventional P-normalization is that, if $\sigma_{norm}$ is low, the normalized score will tend to be higher than expected during a verification process, potentially causing a high false acceptance rate.

This can be overcome by retuning, or adapting, the value of $\sigma_{clamp}$, for example, making it larger in the case that a high degree of mismatch between the voice sample received during enrolment and the cohort is detected, for example setting a negative value for a when determining how to adapt the value of $\sigma_{clamp}$.

Increasing the value of $\sigma_{clamp}$ has the effect of increasing the denominator in the expression for the normalized score $Scr_{norm}$, and consequently reducing the value that is obtained for the normalized score, and therefore reducing the probability that a speech sample received during the verification phase will be accepted.

Thus, in this embodiment, it is determined whether the sample received for enrolment matches the configuration of the system by comparing the sample with a cohort. However, other methods of determining this match may be used. Then, depending on the result of that determination, the parameters used in the verification phase may be adapted. In this embodiment, these are the parameters used in a P-normalization process but, again, depending on the method intended to be used for verification, other parameters may be adapted.

For example, instead of the P-Normalization process described above, another normalization process, such as T-Normalization; Z-Normalization (zero), ZT-Norm (i.e. Z-Norm followed by T-Norm); S-Normalization (symmetric), or AS-Normalization (adaptive S-Norm) may be used.

In addition, in this example, the configuration match score may be compared with two thresholds. If the score is below the lower threshold, then the enrolment attempt is rejected, and if the score is above the lower threshold then the user is enrolled. If the user is enrolled, the score is compared with an upper threshold, and the normalization method that is used during verification is set depending on whether the configuration match score is above or below the upper threshold. In other embodiments, only one of these thresholds may be used. Thus, if only the first threshold is used, then the system simply determines whether to accept or reject the enrolment. If only the second threshold is used, then no enrolment attempts are rejected, but the normalization method that is to be used during verification may be set depending on whether the configuration match score is above or below the threshold.

After the process of enrolment has been completed, the system is ready to be used in a verification phase. As is conventional, the purpose of verification is to determine whether a received speech sample has come from the user that has previously been enrolled.

During the verification phase, an input audio signal received from one or more of the microphones 12, 12a, 12b is received at an input 160, either in response to a prompt from the system to the user, requiring the user to speak a specific phrase or a phrase of their own choosing, or at a time when the user wishes to provide a voice input, for example in the form of a voice command.

When, the system is in an "always on" mode, the input audio signal may be passed to a voice activity detection block (not shown in FIG. 3), which determines whether the signal contains speech. In addition, a speech signal may be analysed by one or more quality filters (not shown in FIG. 3), which determine whether the signal meets certain predetermined quality criteria. For example, a signal may be used for the purposes of verification only if the signal-to-noise ratio of the signal exceeds a threshold. If the quality criteria are not satisfied, the signal is rejected.

Assuming that any quality criteria are satisfied, the signal is passed to a biometric scoring block 162, which compares the received speech signal with a BVP that has been generated during the process of enrolment, and which then generates a match score indicating a degree of similarity between the speech signal and the BVP.

The biometric scoring block 162 may also be configured to perform a normalization process, for example a P-normalization process. In that event, the parameters to be used for the normalization process may be obtained from the device configuration parameter store 128. Alternatively, the biometric scoring block 162 may be configured to perform a scoring process that involves the use of a Universal Background Model (UBM). In some embodiments, as described above, the form of normalization that is performed by the biometric scoring block 162 depends on the configuration matching score generated by the block 114, and the comparison result obtained by the block 122. For example, if the configuration matching score value exceeds the second threshold value applied by the block 122, the verification parameters may be set such that a first normalization method is used during verification, while, if the configuration matching score value does not exceed the second threshold value, the verification parameters may be set such that a different second normalization method is used during verification. The parameters used during the first and/or second normalization method may also be set to depend on the configuration matching score value.

The output from the biometric scoring block 162 is then passed to a first decision block 164, which makes a decision relating to the question of whether the received speech is the speech of the enrolled user. The decision may be a yes/no decision, depending on whether or not the match score exceeds a predetermined threshold. Alternatively, the decision may be in the form of a probability.

This aspect of the verification is generally conventional. However, one problem that arises with a verification process of this type occurs because of the possibility of a mismatch between some aspect of the received test speech sample and the configuration of the system. For example, in a system that compares the received test speech sample with a cohort, the result of that comparison will depend on how well the audio conditions of the received speech sample match the audio conditions of the cohort. For example, if the cohort samples are obtained under ideal conditions, in terms of the noise and channel, the result of the comparison between the received speech sample and the cohort will also depend on the noise and channel conditions under which the received speech sample has been obtained. Similarly, if the cohort samples are obtained from speakers with a particular accent, the result of the comparison between the received speech sample and the cohort will also depend on the accent of the speaker.

A voice biometric system is typically configured to work with a specific false acceptance rate (or a specific false rejection rate, or a specific equal error rate), and this requires a threshold to be determined, such that the received speech sample is accepted or rejected depending on whether the calculated match score exceeds that threshold. However, the suitable value for the threshold will depend on the conditions that apply when the test speech sample is generated.

By way of example, if the audio conditions applying to a test audio sample are more similar to the audio conditions that applied during enrolment than they are to the audio conditions that applied while the cohort samples were being obtained, the calculated biometric score will be higher than expected, and the test audio sample may be wrongly accepted as corresponding to the enrolled user. For example, if the enrolled user has a different accent from the cohort, and/or is enrolled into the system on the basis of audio samples generated under different noise and/or channel conditions from the cohort, and a different speaker has the same accent as the enrolled user, or provides a test sample under similar noise and/or channel conditions to the enrolled user, there is a significant probability that that different speaker will be accepted as the enrolled user.

Other audio conditions that may be taken into account, to determine whether the conditions that apply to the test sample correspond to the conditions that apply to the cohort or other system configuration, include characteristics of the speech, such as: the language being spoken, the pitch of the speech, the rate of the speech, and environmental conditions such as the degree of reverberation in the audio.

As described above, one way to reduce this risk is to have a cohort that is very similar to the enrolment, including the possibility of rejecting an enrolment attempt if it appears that the audio conditions (including the accent of the speaker) differ significantly from the conditions of the cohort.

The embodiment shown in FIG. 3 therefore includes an alternative or additional mechanism for helping to overcome this problem, by determining whether the audio conditions applying to the received test speech sample are an acceptable match for the system configuration, that is, for the audio conditions that applied to the cohort. Thus, it may be determined that the audio conditions applying to the received test speech sample are an acceptable match for the system configuration, if they allow a predetermined threshold to be validly used.

Specifically, the test audio sample received at the input 160 is also passed to a block 166, which determines if the test audio sample received for the purposes of verification matches the system configuration.

One method for determining if the test audio sample received for the purposes of verification matches the system configuration is to look for similarity between the Gaussians visited by: the verification audio on the cohort models; the enrolment audios on the cohort; and the enrolment audios of each cohort member on the rest of the cohort models.

More specifically, we look at the similarity of Gaussians visited by enrolment audios on the cohort (a 1×128 vector, where 128 is the number of Gaussians), with the Gaussians visited by the enrolment audios of each cohort member on the rest of cohort models (averaging this across all cohort members to arrive at a first 1×128 vector for males and another 1×128 vector for females), and with the Gaussians visited by the verification audio on the cohorts (a 1×128 vector), by comparing the 3 resulting vectors at the same time.

Thus, we get 3 vectors: Zec, representing the Gaussians from enrolment audios on the cohort models, Zcc, representing the Gaussians from the cohort audios on the cohort models, and Zvc, representing the Gaussians from verification audio on the cohort model. Then we calculate a score vf=sum(Zec/|Zec|*Zcc/|Zcc| *Zvc/|Zvc|), where "*" represents element-wise multiplication. Thus, Zec, Zcc, and Zvc are each divided by their respective modulus to obtain three vectors of modulus 1, and the element-wise multiplication generates a single 1×128 vector. The sum operation therefore computes the similarity of the three vectors, and so vf is used as the final score of the match determination block 166.

The output from the match determination block 166 is then passed to a second decision block 168, which makes a decision as to whether the audio conditions applying to the test audio sample received for the purposes of verification match the system configuration. The decision may be a yes/no decision. Alternatively, the decision may be in the form of a probability.

If the decision block 168 is configured to provide a yes/no answer, then the system may be such that the verification attempt is automatically rejected in the event that the audio conditions applying to the test audio sample are found not to match the system configuration, regardless of the score generated by the biometric scoring block 162.

Indeed, the test audio sample received for the purposes of verification may be passed to the match determination block 166 for a decision and, if it is found that the audio conditions applying to the test audio sample do not match the system configuration, the test audio sample may not be passed to the biometric scoring block 162.

If the first decision block 164 and the second decision block 168 are each configured to generate outputs in a non-binary form, that is, they are configured to generate outputs that are not simply yes/no decisions, then those outputs may be passed to a combination block 170, which generates a combined decision as to whether the test sample provided for the purposes of verification should be accepted.

As mentioned above, steps may be taken to reject an enrolment attempt if the received speech sample differs from the cohort. Alternatively, steps may be taken to reject a speech sample provided during the verification phase, if it differs from the cohort. However, there is an advantage in using both of these techniques together, namely taking steps to reject an enrolment attempt if the received speech sample differs from the cohort, and also, when a user has been enrolled, taking steps to reject a speech sample provided during the verification phase, if it differs from the cohort. For example, if steps are going to be taken to reject a speech sample provided during the verification phase, if it differs from the cohort, then the criteria applied during the enrolment phase may be less restrictive, thereby decreasing the failure to enroll rate.

Figure 5:
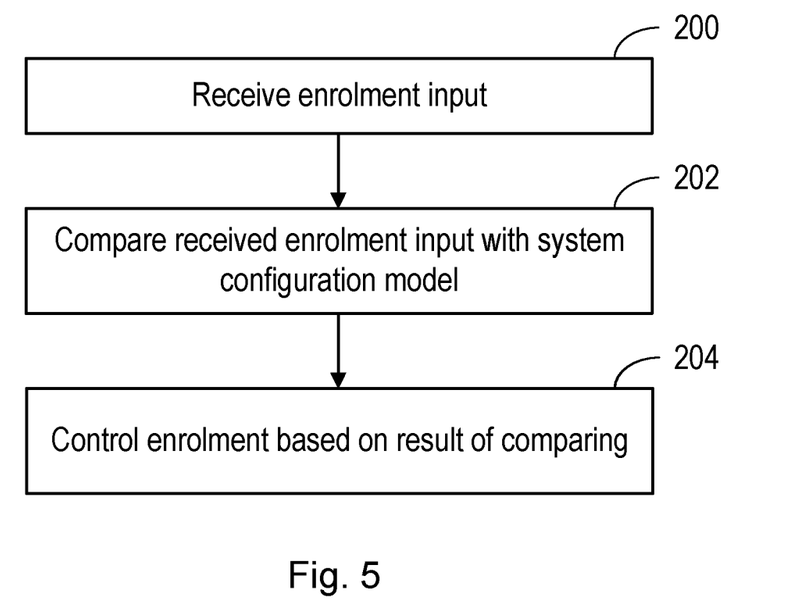
FIG. 5 is a flow chart illustrating a first method.

FIG. 5 is a flow chart, illustrating a method of handling an enrolment attempt in the operation of a voice biometric system. The method comprises, at step 200, receiving an enrolment input from an enrolling user. At step 202, the received enrolment input is compared with a system configuration model to obtain a configuration matching score value. At step 204, the enrolment is controlled based on a result of comparing the received enrolment input with the system configuration model.

Figure 6:
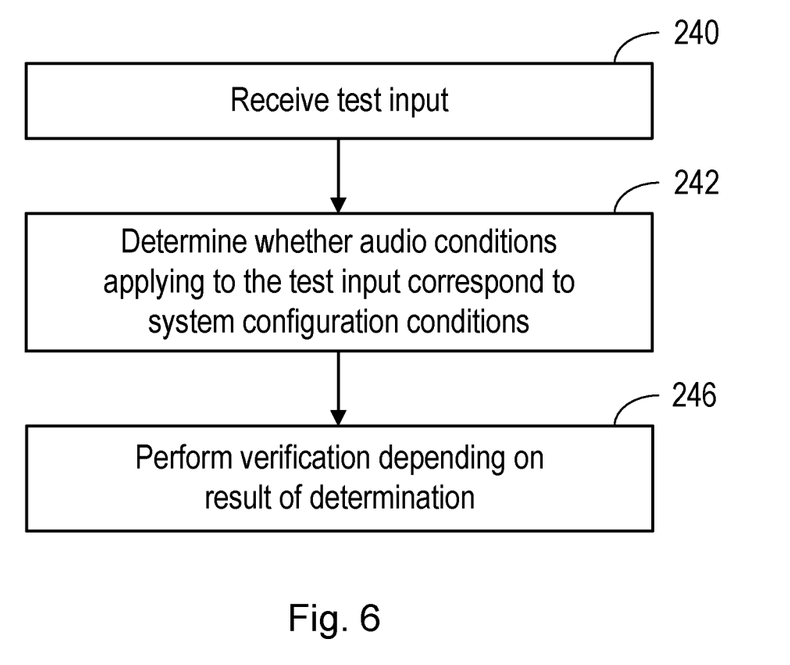
FIG. 6 is a flow chart illustrating a second method.

FIG. 6 is a flow chart, illustrating a method of handling a verification attempt in the operation of a voice biometric system. The method comprises, at step 240, receiving a test input from a speaker. At step 242, it is determined whether audio conditions applying to the test input correspond to system configuration conditions. At step 244, verification is performed, by comparing the test input with a model of the speech of an enrolled user to generate a verification score for use in deciding whether to accept or reject the speaker, depending on whether it is determined that audio conditions applying to the test input correspond to the system configuration conditions.

If it is determined that audio conditions applying to the test input do not correspond to the system configuration conditions, then the verification may not be performed, and the verification attempt may be refused.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units.

A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of operation of a biometric system, the method comprising:
   receiving an enrolment input from an enrolling user;
   comparing the received enrolment input with a system configuration model to obtain a configuration matching score value; and
   comparing the configuration matching score value with a first threshold value; and
   if the configuration matching score value exceeds the first threshold value, enrolling the user and creating a model from the enrolment input, and setting verification parameters such that a first normalization method is used during verification; and
   if the configuration matching score value does not exceed the first threshold value, enrolling the user and creating a model from the enrolment input, and setting verification parameters such that a second normalization method is used during verification.

2. A method according to claim 1, wherein the biometric system is a voice biometric system.

3. A method according to claim 1, wherein comparing the received enrolment input with a system configuration model comprises comparing the received enrolment input with a cohort derived from a plurality of other people.

4. A method according to claim 1, wherein comparing the received enrolment input with a system configuration model comprises comparing the received enrolment input with a universal background model.

5. A method according to claim 1, comprising:
   comparing the configuration matching score value with a second threshold value; and
   enrolling the user and creating a model from the enrolment input if the configuration matching score value exceeds the second threshold value, or rejecting the enrolment if the configuration matching score value does not exceed the second threshold value.

6. A method according to claim 1, comprising:
   if the configuration matching score value exceeds the first threshold value, enrolling the user and creating a model from the enrolment input, and setting score normalization parameters based on the configuration matching score value, such that verification can be performed by comparing a test input with said model to generate a verification score, normalizing said score using said score normalization parameters, and accepting or rejecting the test input based on the normalized score.

7. A method according to claim 1, comprising:
   if the configuration matching score value exceeds the first threshold value, enrolling the user and creating a model from the enrolment input, and setting at least one threshold modification parameter based on the configuration matching score value, such that verification can be performed by comparing a test input with said model to generate a verification score, modifying a second threshold value using said at least one threshold modification parameter, and accepting or rejecting the test input based on a comparison between the verification score and the modified second threshold value.

8. A method according to claim 1, wherein the first normalization method is selected from a group comprising: P-Normalization, T-Normalization; Z-Normalization, ZT-Normalization, S-Normalization, and AS-Normalization.

9. A method according to claim 1, wherein the second normalization method comprises a score subtraction method.

10. A biometric system, comprising:
    an input, for receiving an enrolment input; and
    a processor, wherein the processor is configured for performing a method comprising:
      receiving an enrolment input from an enrolling user;
      comparing the received enrolment input with a system configuration model to obtain a configuration matching score value; and
      comparing the configuration matching score value with a first threshold value; and
      if the configuration matching score value exceeds the first threshold value, enrolling the user and creating a model from the enrolment input, and setting verification parameters such that a first normalization method is used during verification; and
      if the configuration matching score value does not exceed the first threshold value, enrolling the user and creating a model from the enrolment input, and setting verification parameters such that a second normalization method is used during verification.

11. A device comprising a biometric system according to claim 10.

12. A device according to claim 11, wherein the device comprises a mobile computing device, a games console, a remote control device, a home automation controller or a domestic appliance, a toy, a machine, an audio player, a video player, or a mobile telephone.

13. A non-transitory computer-readable storage medium, comprising code, for causing a processor to perform a method according to claim 1.

* * * * *

UNITED STATES PATENT AND TRADEMARK OFFICE
CERTIFICATE OF CORRECTION

PATENT NO. : 11,158,325 B2
APPLICATION NO. : 16/662664
DATED : October 26, 2021
INVENTOR(S) : Gonzalez et al.

It is certified that error appears in the above-identified patent and that said Letters Patent is hereby corrected as shown below:

In the Claims

1. In Column 14, Line 7, in Claim 5, delete "enrolment" and insert -- enrolment input --, therefor.

2. In Column 14, Line 32, in Claim 8, delete "T-Normalization;" and insert -- T-Normalization, --, therefor.

Signed and Sealed this
Twenty-second Day of August, 2023

Katherine Kelly Vidal
Director of the United States Patent and Trademark Office